United States Patent
Novak et al.

(10) Patent No.: US 9,514,423 B2
(45) Date of Patent: Dec. 6, 2016

(54) TEST PLANNING TOOL FOR SOFTWARE UPDATES

(75) Inventors: Miroslav Novak, Prague (CZ); Petr Panuska, Prague (CZ); Albert Regner, Karlovy Vary (CZ); Lukas Barton, Prague (CZ)

(73) Assignee: Hewlett Packard Enterprise Development LP, Houston, TX (US)

( * ) Notice: Subject to any disclaimer, the term of this patent is extended or adjusted under 35 U.S.C. 154(b) by 1578 days.

(21) Appl. No.: 12/876,651

(22) Filed: Sep. 7, 2010

(65) Prior Publication Data

US 2012/0060144 A1 Mar. 8, 2012

(51) Int. Cl.
*G06F 9/44* (2006.01)
*G06Q 10/06* (2012.01)

(52) U.S. Cl.
CPC .................................... *G06Q 10/06* (2013.01)

(58) Field of Classification Search
USPC ......................................................... 717/125
See application file for complete search history.

(56) References Cited

U.S. PATENT DOCUMENTS

2004/0143819 A1* 7/2004 Cheng et al. ................. 717/125
2005/0193268 A1* 9/2005 Allor et al. ..................... 714/38

OTHER PUBLICATIONS

Kelly, Michael; "Test planning using IBM Rational Quality Manager"; Feb. 3, 2009; IBM developerWorks website; pp. 1-11.*

* cited by examiner

*Primary Examiner* — Wei Zhen
*Assistant Examiner* — Clint Thatcher
(74) *Attorney, Agent, or Firm* — Trop, Pruner & Hu, P.C.

(57) ABSTRACT

A test planning tool for defining a test plan for testing updates to a software product aggregates information from a variety of diverse sources to generate an application model. The application includes a detailed model of the components of the application and their dependencies, a logical structure of the components, requirements associated with changes to the components, organizational entities responsible for the changes, and various other information, such as test coverage and defect information. The application model is presented to the user in a manner that allows the user to select components of interest, drill down and view change details and requirements, and to use that information to develop a test plan.

20 Claims, 3 Drawing Sheets

TEST PLANNING TOOL FOR SOFTWARE UPDATES

BACKGROUND

Software providers often release changes and updates to their products. To respond to the demands of a rapidly evolving marketplace, these changes and updates must be released quickly without sacrificing quality. To ensure quality, software vendors engage in comprehensive testing of their products. However, such testing generally is complex and time consuming, due in part to the fact that changes in one portion of a software product often impact other portions of the product. Thus, not only must changed portions of a software product be tested, but the software provider must also assess and evaluate the impact of the changes on the overall product prior to release of an update. Since software products typically are quite complex, quality control over changes can be a costly and time-consuming discipline that requires comprehensive information from a variety of diverse sources in order to deliver quality updated products effectively and in a timely manner.

BRIEF DESCRIPTION OF THE DRAWINGS

Some embodiments are described with respect to the following figures.

DETAILED DESCRIPTION

Implementing software product changes and developing test plans to evaluate the changed product conventionally have been tasks that have been performed manually and in an uncoordinated fashion. For instance, a software architect typically would generate a model of the software product that details the product's architecture and technical aspects. A software developer later would identify changes implemented in the product to provide new or improved features and/or to address reported defects. An impact report listing reported defects and showing the changes and any other relevant information then would be manually generated and reviewed. Generally, this latter task would entail gathering information from many different sources and compiling it into a single report. The report could then be evaluated to develop a test plan for the changed product which balances the need to release the revised product in an efficient and timely manner against the need to perform a comprehensive evaluation of the changes and their impact on other portions of the software application. However, this overall process of implementing changes and ensuring delivery of a thoroughly tested product has been error prone due in part to the uncoordinated gathering and evaluation of information from diverse sources. If either the information gathering or evaluation tasks are incomplete or inaccurate, then insufficient information exists to provide for the creation of an efficient, yet complete, test plan for the revised product.

Accordingly, illustrative embodiments described herein provide a method and tool for developing a test plan for effectively testing changes implemented in a software application. In some embodiments, the method and tool also enable assessment of the risk associated with incomplete testing of changes. Using this risk assessment information, a test plan can be developed that reduces both the amount of effort needed to test changes in a manner and the risk associated with incomplete testing. In illustrative embodiments, the method and tool provide for effective testing and reduction of risks by combining relevant information relating to the software product into an application model in a manner that enables a developer to focus on critical changes and evaluate completeness and coverage of test plans before the plans are executed.

Figure 1:
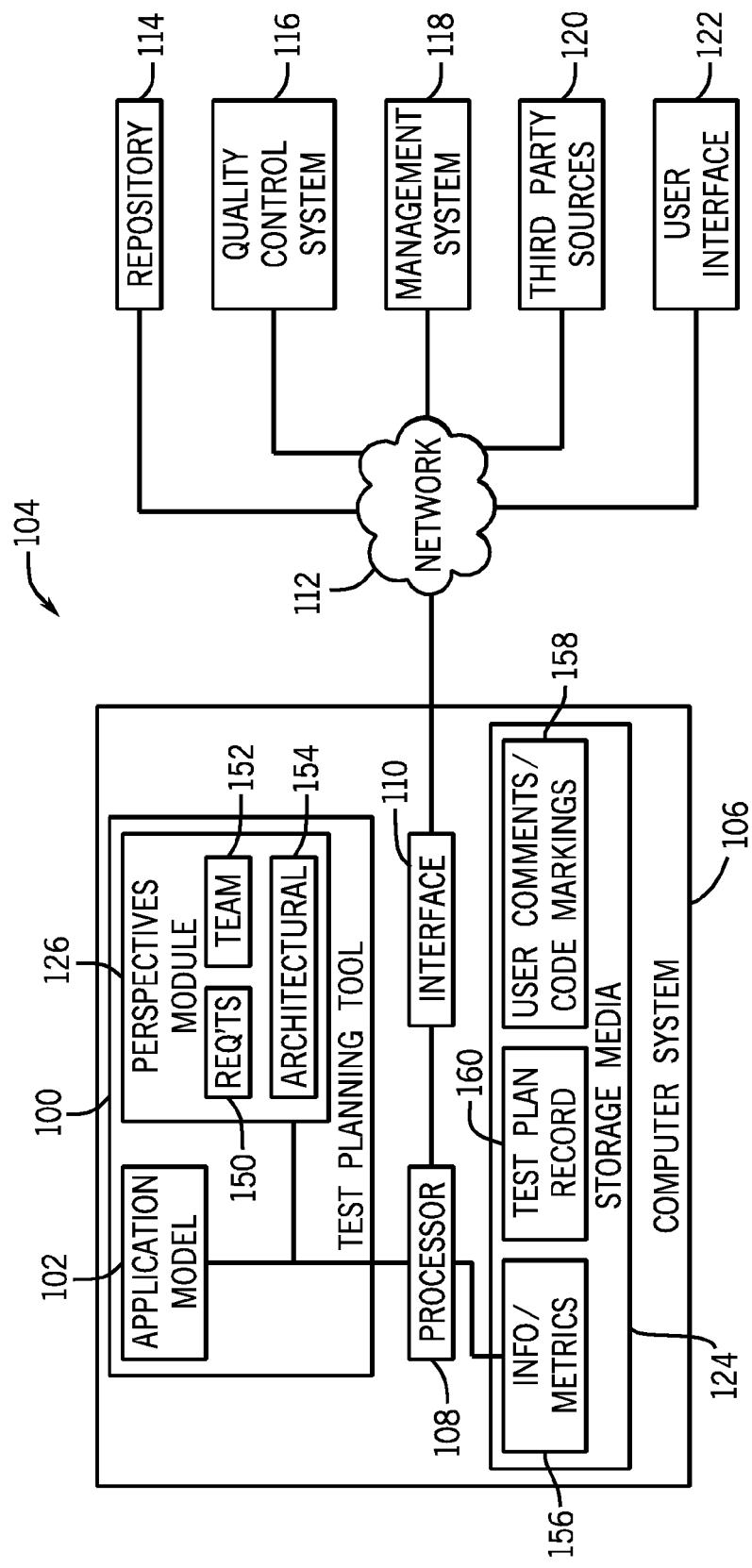
FIG. 1 is a block diagram of an exemplary system in which an exemplary test planning tool is implemented, according to an embodiment.

In exemplary implementations, a test planning tool 100 leverages an application model 102 that is generated for the software product by automatically linking information that is extracted or imported from a variety of diverse sources, including existing repositories and analysis tools. An exemplary system 104 in which the tool 100 and model 102 can be implemented is shown in FIG. 1. System 104 includes a computer system 106 on which the test planning tool 100 and the application model 102 are implemented. In the embodiment shown, the tool 100, including the model 102, are executable on a processor 108. The processor 108 is connected to storage media 124 which can be implemented with one or several disk-based storage devices and/or one or several integrated circuit (IC) or semiconductor storage devices.

The processor 108 also is connected through an interface 110 (e.g., a network interface) to a network 112, such as the Internet, an intranet, local network, wireless network, wide area network, combinations of the foregoing, etc. In this manner, the test planning tool 100 is coupled to a variety of information sources and tools, which may include a repository 114 that maintains an organization's software products, a quality control system 116, a management system 118, various third party sources 120, etc. Any or all of these information sources and tools may be part of or maintained on a storage system that may include one or several storage devices, such as storage disks, magnetic memory devices, optical memory devices, flash memory devices, etc.

As shown in FIG. 1, the test planning tool 100 also may be coupled to a user interface 122, which may include a display and various input/output devices that enable a user to interact with the test planning tool 100. For instance, a user may input information to the test planning tool 100 using the user interface 122. The test planning tool 100 may output information to the user via the user interface 122 to assist the user in developing a test plan. In some embodiments, the user may control or filter the manner in which the information is displayed using a perspectives module 126, as will be explained in further detail below. Although shown separately in FIG. 1, all or portions of the test planning tool 100, including the application model 102 and the perspectives module 126, may be maintained on storage media 116.

Figure 2:
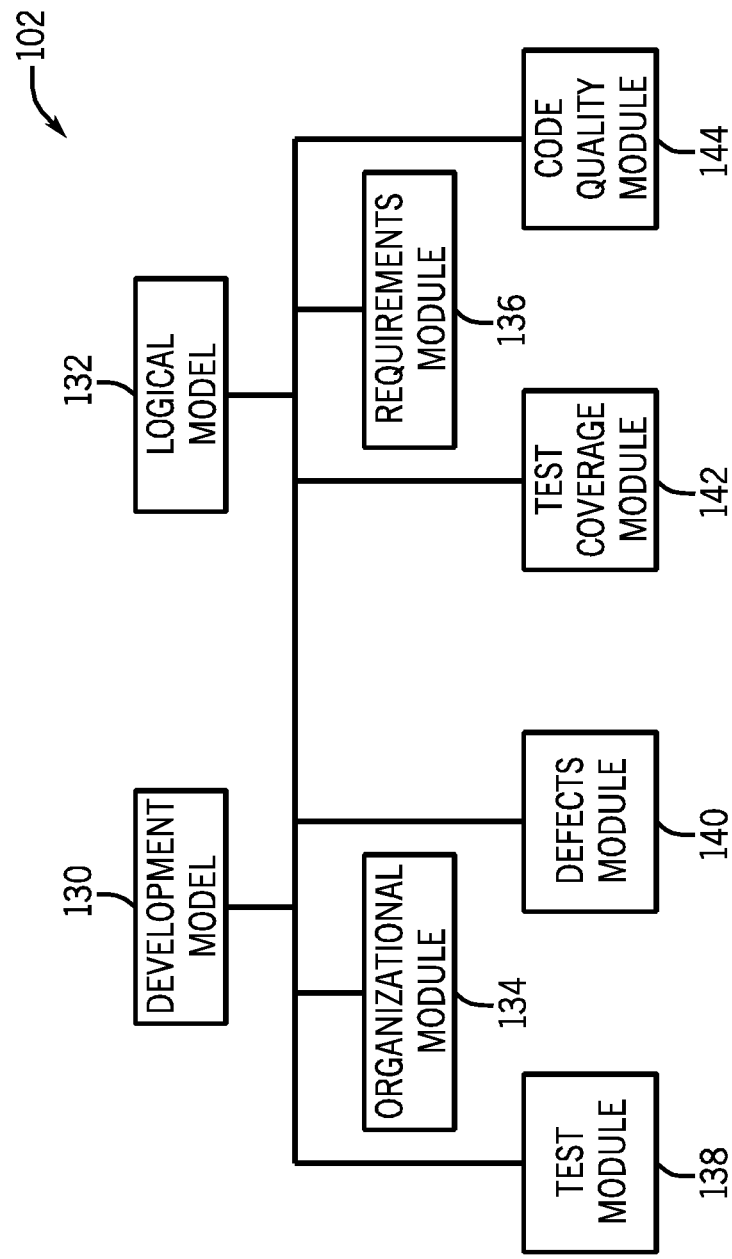
FIG. 2 is a block diagram of an exemplary application model, in accordance with an embodiment.

The test planning tool 100 assists with developing test plans for changes to software applications by leveraging the application model 102. FIG. 2 illustrates an exemplary implementation of the application model 102. In the embodiment shown, the model 102 links together a development model 130, a logical model 132, an organizational module 134, a requirements module 136, test module 138, a defects module 140, a test coverage module 142, and a code quality module 144. When a representation of the application model 102 is displayed to the user, a user can, for example, review the effects of changes, drill-down and classify the changes, and create a test plan covering the changes.

Development Model.

The development model 130 provides a low-level model of the technical details of the application model 102. In general, the development model 130 reflects the physical structure of the various source code components of the software application and their dependencies or relationships. In some embodiments, the development model 130 includes implementation and configuration files that have been developed for the application. For instance, in an exemplary implementation, the development model can be automatically generated from build files and/or project files, such as Maven, Eclipse or IntelliJ IDEA build or project files which may be imported from the repository 114 in which the business organization maintains the source code and other information relating to its software products.

Logical Model.

The logical model 132 provides an abstraction layer above the development model 130. In an exemplary embodiment, the logical model is generated by creating high-level logical components that reflect the logical architecture of the software application. In some embodiments, the logical architecture may be imported from the repository 114. The high-level components of the logical architecture can bind to the development model 130 which provides the detail for creating the lower-level logical components of the logical model 132.

Organizational Module.

In some embodiments, the organization module 134 projects a business organization structure onto the logical and development models 132/130. In general, the organizational structure may provide information regarding organizational entities (e.g., departments, divisions, groups, teams, etc.) and their members. Linking the organizational structure to the logical and development models 132/130 enables identification of the entities/members that are responsible for various portions of the software application. In some embodiments, the organizational module 134 includes a user interface or is coupled to the user interface 122 to enable a user to assign organizational entities and their members to specific components of the logical and development models 132/130. In other embodiments, the organizational module 134 may extract information from project/build files in the repository 114 that reflect the authors of those files. In yet other embodiments, entities and membership may be extracted from systems within the organization that maintain the organizational structure, such as management system 118.

Requirements Module.

The requirements module 136 enables the projection of business and/or quality requirements onto the logical and development models 132/130. For instance, business requirements may specify a priority level associated with changes, such as by specifying that high priority changes "Must" be implemented in the software application within a certain time period or project milestone. Other changes may be specified with lower priority. In some embodiments, requirements may be imported from a quality control system 116 and/or management system 118, for example.

Test Module.

In the exemplary embodiment shown, the test module 138 links available tests to portions of the software application that are defined by the logical and development models 132/130. This linking can enable a user to review which tests are available for a particular portion of the application. In some embodiments, information regarding available tests may be imported from various sources which maintain testing information, such as the organization's quality control system 116.

Defects Module.

In some implementations, the defects module 140 models defects and associates them with the logical and development models 312/130. As with the testing information, defect information for creating the model may be imported from various sources, such as a repository of defect information maintained by the organization's quality control system 116, third party sources 122 which test for and report defects (e.g., Bugzilla, Jira, etc.), etc. Yet further, in some embodiments, defect information may also be obtained from the source code repository 114. For instance, when software developers commit changes, they often include comments. These comments may include information about defects (e.g., type of defect, number of defects, etc.), particularly in cases in which a change has been implemented to correct a defect. This information may be used to link defects to affected components.

Test Coverage Module.

In exemplary embodiments, the test coverage module 142 determines which portions of the application are tested by automated tests (also referred to as the test coverage). Test coverage represents information in the form of a metric that can be projected to the logical and development models 132/130. In some embodiments, the test coverage module 142 is implemented using a readily available third-party test coverage tool 122 that is configured to compute coverage, such as Cobertura, for instance.

Code Quality Module.

The code quality module 144 measures the quality of the source code. In some embodiments, the code quality module 144 is implemented using readily available third-party testing tools 122, such as Checkstyle, FindBugs, etc., that automatically measure and report quality of code. As with the test coverage information, the determined code quality information can be projected to the logical and development models 132/130.

The various models and modules and the sources of information discussed above are provided as examples only. In other embodiments, the test planning tool 100 and application model 102 may include additional or different models or modules and may aggregate information from a variety of additional or different sources then those discussed above.

Once created, the application model 102 may be updated as new information and metrics become available and/or are created. For example, new information about defects, committed software updates, test results, test coverage, impact testing, reports, etc. all may be incorporated into the various modules to enhance the ability of the tool to enable creation of effective test plans.

Exemplary implementations further facilitate the creation of effective test plans by enabling the information that has been aggregated by the test planning tool 100 to be filtered or viewed from different perspectives. In this manner, a user may more readily focus on the components of the software application that are the user views as being the most important and then drill-down to particular changes. Accordingly, an exemplary implementation includes the Perspectives module 126 that provides several different perspectives for reviewing changes to the application and developing a test plan for the changes. These perspectives include a Requirements perspective 150, a Team perspective 152, and an Architectural perspective 154. It should be understood, however, that the foregoing have been listed as examples only, and that additional and/or different perspectives may be used to view application changes and develop test plans depending on the particular environment in which the test planning tool 100 is employed.

Requirements Perspective.

In an exemplary embodiment, the Requirements perspective 150 enables a user to review the application model 102 from the perspective of requirements. In accordance with this perspective, logical and development components are grouped by related requirements, such as all changes that "Must" be implemented within a particular project milestone. The requirements may have a hierarchical relationship, wherein a particular requirement may have one or multiple sub-requirements, and so forth. Using the Requirements perspective, a user can review top-most requirements and then drill-down to sub-requirements. The user also may sort requirements by priority or target milestone. For example, a user can select to review changes in the software application that are implemented within a first milestone and which have been designated as a top priority (e.g., "Must") requirement. As another example, the user may select to focus on all requirements that are implemented by a particular organizational entity. Yet further, the user may select to focus on all changes that affect a particular component of the application.

Team Perspective.

In an exemplary embodiment, the Team perspective 152 enables the user to group logical components of the software application based on the organizational entity (e.g., team) that provides the components. In this manner, the Team perspective 152 enables the user to focus on changes made by a particular team or even by a particular team member. In some embodiments, the user can further specify a time period for viewing the changes, e.g., all changes implemented by a particular team with the last week.

Architectural Perspective.

In an exemplary embodiment, the Architectural perspective 154 enables a user, such as a software architect, to review changes from the point of view of the logical structure of the application and drill-down and focus on changes in particular components. As an example, the Architectural perspective can enable an architect to review which teams and what changes have been made in a particular component and which other portions of the application use or depend on this changed component.

In some embodiments, the Perspective module 126 also may allow the user to select a view in which none of the information is filtered. In any event, regardless of the selected view, aggregated information and metrics 156 associated with the changes can be displayed to the user in conjunction with the model information. For instance, the displayed perspective may provide a top level view of the logical model 132 and development model 130, which allows the user to select components that are of interest and drill down into the details which many be provided in the form of information and metrics 156. In exemplary implementations, the information and metrics 156 may be associated with (but is not limited to) changes, coverage, defects, test results, test coverage, impact of changes, etc. In some embodiments, the information and metrics 156 may be compiled and/or determined by the test planning tool 100 and may be stored on the storage media 124.

For instance, in exemplary embodiments, the test planning tool 100 may collect or determine change information that includes the number of changes (or commits); identification of changed lines of codes or changed files; total number of changed lines or changed files; etc. The information may be associated with all changes in the entire application or changes in only selected portions of the application. As an example, the user may be presented with various logic components from the logic model 132 and development components from the development model 130. If the user selects a development component, the user may drill down until the user is presented with information identifying the lines of code that have been changed and the differences between the original lines and the revised lines.

Coverage information relates to the amount of the source code that can be tested by automated testing. In exemplary implementations, code coverage is computed by the test coverage module 142 on a periodic basis. Correlation of code coverage information with changes can facilitate assessment of the risk associated with not implementing a manual test of a particular change. Aggregate code coverage may be presented to the user. Alternatively, as the user drills down into the details of selected components of the application model 102, coverage information may be displayed with respect to the selected component.

Defect information likewise can assist with determining the need to manually test a particular component of the software application. As an example, if the aggregated information indicates that a component has a large number of defects and its code coverage is low, then manual testing of the component may be worthwhile. Again, aggregate defect information may be presented to the user, or the defect information may be presented at the component level.

Test information may include results from automatic tests associated with a component (e.g., number of tests performed, percentage of successful tests, percentage of failed tests, tests that were not executed, etc.). Again, this information may be used to assess the desirability of conducting a manual test. For instance, components that are not tested by an automatic test or that have a high percentage of failed tests may require a higher priority for manual testing.

Some embodiments may also provide a metric showing the number of changes that were not covered by automated tests. This metric again can facilitate developing a test plan that includes manual testing of the non-covered components.

Impact information also may assist in developing a test plan. Impact information provides information regarding the number and identity of components that directly and indirectly depend on a portion of the application that has undergone a change. Thus, impact information can enable an assessment to be made regarding which other components of the application should be tested. In some embodiments, when making this assessment, the user may elect to focus on only changes that were made within a specific time period, e.g., since the beginning of a milestone, since the last run of manual tests, etc. Consideration of a time period in this manner may reduce the amount of testing that is included in the test plan.

The various types of information and metrics 156 discussed above can assist with the identification of portions of the application that should be manually tested. For instance, using the application model 102, the user can review the internal structure of the identified portion and analyze particular changes that have been made to that portion. As an example, the user can drill down to the implementation and configuration files in the development model, review information that identifies the lines of source code that have been changed, review the changes and assess the impact of the changes on other portions of the software application. In some instances, this drill-down procedure may result in the user determining that the changes will have little or no impact on other components. If so, then the user may mark the component with a "Safe" indication 158. The "Safe"

indication 158 can then be used in the test planning process so that "Safe" components are tested with lower priority. Alternatively, the user may mark the component in a manner that indicates that the component has a high priority for manual testing. In exemplary embodiments, indications 158 may be stored in the storage media 124.

In addition to marking components to indicate priority for manual testing, the markings 158 may include user comments that the user inserts with the goal of sharing the user's knowledge with other users of the application model 102. The ability to insert comments/markings 158 may enable effective collaboration between the different roles that are typically involved in test planning, such as quality assurance personnel, software architects, project managers, etc.

In exemplary implementations, once the changes have been reviewed and marked using the test planning tool 100, a test plan for the changes can be defined. In some embodiments, the aggregate information and metrics 156 that have been collected and reviewed may enable the user to focus the test plan on only the most critical changes. As an example, the test planner can begin the test planning process by focusing on those changes that have been implemented since the beginning of a particular milestone with a "Must" requirement. The planner may then first analyze the components that have the lowest code coverage (as indicated by the coverage metric) and the most defects (as indicated by the defects metric) and ignore (at least temporarily) the changes marked as "Safe." If the planner decides that a particular component should be tested, then the planner may select from available tests (as indicated by the test information) and add the selected test(s) to the test plan. In some implementations, the test planning tool 100 may inform the planner about the total effort required to perform each additional test that is added to the list and the code coverage that will be achieved by running the selected tests.

Code coverage for the test plan may be reported for a single change, as well as the total coverage for all changes that are covered by the test plan. The reported code coverage also may be broken down so that coverage relating to testing "Safe" changes is excluded and/or coverage relating to components that are covered by automated testing is excluded.

In some embodiments, the test planning tool 100 may maintain a record 160 of the final test plan, including the road map the planner followed to arrive at the test plan. For instance, the test plan record 160 may include the changes that were identified, the changes that were marked as "Safe," comments added to changes and components, and related information and metrics reported by the test planning tool 100 (e.g., coverage, defects, etc.). Maintaining the test plan record 160 may enable constant improvement of the test planning process as it provides guidance on test planning techniques and choices that may have been more or less successful than others.

Figure 3:
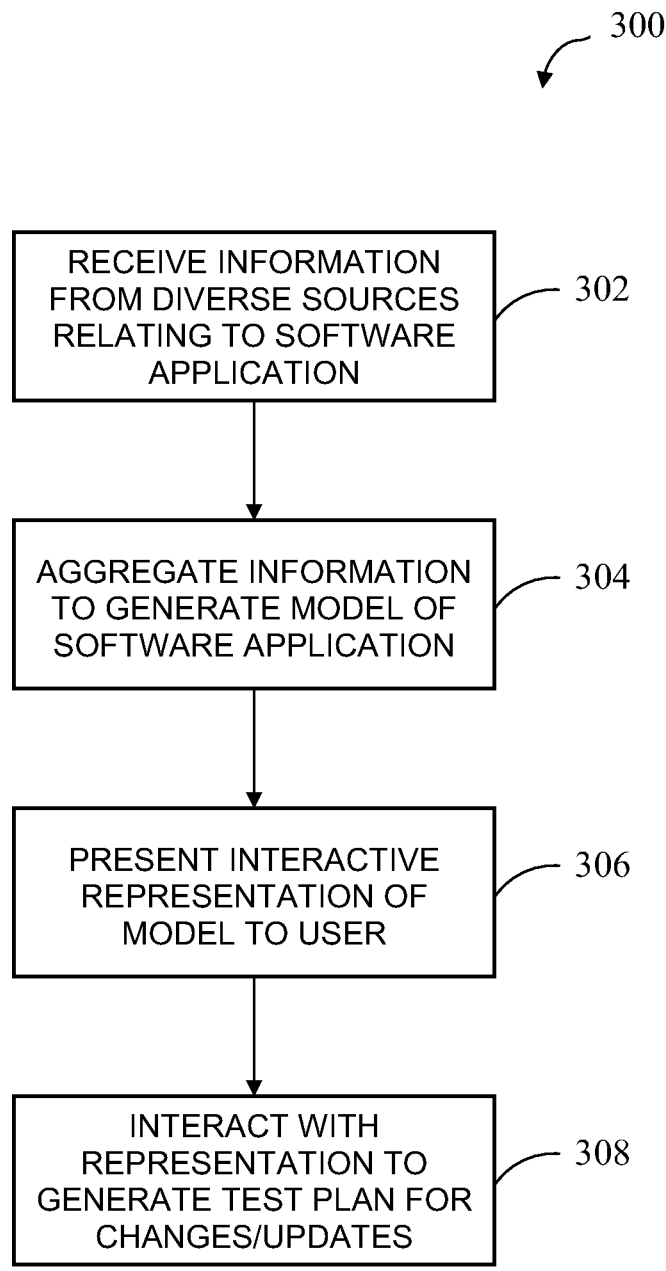
FIG. 3 is a flow diagram of an exemplary technique for generating a test plan using the test planning tool of FIG. 1, in accordance with an embodiment.

A flow diagram of an exemplary technique 300 for defining a test plan using the test planning tool 100 is shown in FIG. 3. At block 302, information relating to a software application is received from a variety of diverse sources (e.g., sources 114, 116, 118, 120). At block 304, the received information is aggregated to generate a model of the software application (e.g., model 102). At block 306, a representation of the model is presented to a user with which the user can interact (e.g., via user interface 122) to define a test plan for testing changes/updates that have been made to the corresponding software application. The representation may be presented in any of a variety of formats, including graphs, hierarchical structures, listings of code, text, filters, colors, pull-down menus, combinations of the foregoing, etc., which facilitate the user's viewing, understanding and/or interaction with the model so that a test plan can be generated. In some embodiments, the user can use the perspectives module 126 to filter the information presented to the user so that the user can more readily focus on relevant details. At block 308, the user interacts with the representation to generate a test plan for testing the changes/updates to the software application.

Generation and utilization of the application model 102 of the software application using the test planning tool 100 enables effective and efficient test planning for changes that are implemented in a software product. As described above, the logical model 132 is readily and accurately generated by populating the high-level abstraction layer representing the logical structure with low-level source code development artifacts (e.g., IDE project files, build system project files, etc.) extracted from the development model 130 and the repository 114. Many portions of the application model 102 (e.g., the development model 130, the logical model 132, organizational structure 134, requirements 136) may be automatically discovered, which may enhance the overall accuracy of the model 100. Moreover, linking together requirements, defects and architecture may facilitate the proper identification of changes that truly are critical. Using the aggregated information contained in the application model 102, a test planner can review particular changes and classify their relevance (e.g., mark as "Safe"). This information, along with other metrics, can be projected to the logical and development models 134/132 to improve the accuracy of the test planning results. In addition, providing code coverage information from automated tests reveals to the test planner the portions of the application that already have been tested, thus enabling the planner to prune those portions from the list of components for manual testing. Yet further, aggregating requirements and organizational information enables the planner to easily identify a particular set of changes on which to focus and test. For example, the planner may be tasked with the job of testing all components with "Must" requirements that have been implemented within a particular milestone by a particular organization entity. Thus, a enormous set of changes can be easily pruned to a set of changes that can be readily tested, thus conserving resources and reducing the time to delivery.

Instructions of software described above (including test planning tool 100, application model 102, or portions thereof) are loaded for execution on a processor (such as processor 108 in FIG. 1). A processor can include a microprocessor, microcontroller, processor module or subsystem, programmable integrated circuit, programmable gate array, or another control or computing device. As used here, a "processor" can refer to a single component or to plural components (e.g., one CPU or multiple CPUs). Plural components may perform computing tasks in a distributed manner.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A system to define a test plan for a software application, the system comprising:
    a processor;
    a test planning tool for execution on the processor, the test planning tool including:
        a model representing components of the software application and a logical structure of the components; and
        a requirements module linked to the model to associate requirements with changes to the components; and
    an interface module coupled to the test planning tool to present to a user changes to components and the requirements associated with the changes to thereby define a test plan for components affected by the changes.

2. The system as recited in claim 1, wherein the test planning tool further comprises an organizational module linked to the model to associate organizational entities with components.

3. The system as recited in claim 2, wherein the test planning tool further comprises a test coverage module linked to the model to identify test coverage of components, and wherein the interface module presents to the user the test coverage.

4. The system as recited in claim 3, wherein the test planning tool further comprises a defects module linked to the model to identify defects associated with the components, and wherein the interface module presents to the user the identified defects.

5. The system as recited in claim 4, wherein the test planning tool further comprises a test module to identify available tests for testing the components, and wherein the test planning tool enables the user to select available tests to include in the test plan.

6. The system as recited in claim 5, wherein the test planning tool further comprises a code quality module linked to the model to determine a quality of software code defining the components, and wherein the test planning tool enables the user to view the determined quality.

7. The system as recited in claim 2, wherein the test planning tool further comprises a perspectives module to filter components of the model displayed to the user based on at least one of requirements and organizational entity.

8. The system as recited in claim 7, wherein the information displayed to the user further includes a number of changes, a number of defects, and available tests.

9. The system as recited in claim 1, wherein the test planning tool is configured to maintain a roadmap followed by the user to define the test plan.

10. An article comprising a non-transitory tangible computer-accessible storage medium containing instructions of software code that, when executed by a computer processing device, cause the computer processing device to:
    generate a model of a software application, the model representing components of the software application and a logical structure of the components;
    link to the model a set of requirements associated with changes to the components; and
    present to a user a representation of the model, wherein the representation includes the components, the logical structure of the components, changes to the components, and the requirements associated with the changes to enable the user to define a test plan to test components affected by the changes.

11. The article as recited in claim 10, wherein the instructions further cause the computer processing device to link an organizational structure with the model, the organizational structure associating organizational entities with the components.

12. The article as recited in claim 11, wherein the instructions further cause the computer processing device to filter the representation of the model presented to the user based on at least one of the requirements and the organizational entities.

13. The article as recited in claim 10, wherein the instructions further cause the computer processing device to link a test coverage module to the model to identify components that are covered by automated test.

14. The article as recited in claim 13, wherein the instructions further cause the computer processing device to identify available tests from which the user can select to test components affected by changes.

15. A method of defining a test plan for testing a software application, the method comprising:
    generating a model of the software application, the model including:
        a development model that defines components of the software application and their dependencies;
        a logical model that defines a logical structure of the components; and
        a set of requirements linked to the logical model and the development model, the set of requirements specifying levels of priority associated with changes implemented in the software application; and
    presenting to a user a representation of the model that allows the user to select components and view changes implemented to the components, the requirements associated with the changes, and the organizational entities associated with changed components and to define a test plan to test components affected by the changes.

16. The method as recited in claim 15, wherein the model further includes an organizational structure linked to the development model and the logical model to associate organizational entities with components of the model.

17. The method as recited in claim 16, further comprising filtering the representation presented to the user based on at least one of requirements and organizational entity.

18. The method as recited in claim 15, further comprising:
    determining a test coverage associated with the components, the test coverage identifying components covered by automated testing; and
    presenting the determined test coverage to the user.

19. The method as recited in claim 18, further comprising determining results of testing of the components, and presenting the determined results to the user.

20. The method as recited in claim 19, further comprising maintaining a record of the defined test plan, the record identifying information presented to the user when defining the test plan.

* * * * *